(12) United States Patent
Sykes

(10) Patent No.: US 9,772,418 B2
(45) Date of Patent: Sep. 26, 2017

(54) METHOD AND SYSTEM OF MARINE SURVEY

(75) Inventor: Godfrey H. Sykes, Ross shire (GB)

(73) Assignee: PGS Geophysical AS, Oslo (NO)

( * ) Notice: Subject to any disclaimer, the term of this patent is extended or adjusted under 35 U.S.C. 154(b) by 1525 days.

(21) Appl. No.: 13/253,201

(22) Filed: Oct. 5, 2011

(65) Prior Publication Data

US 2013/0088937 A1   Apr. 11, 2013

(51) Int. Cl.
*G01V 1/38* (2006.01)

(52) U.S. Cl.
CPC .......... *G01V 1/3826* (2013.01); *G01V 1/3817* (2013.01); *G01V 1/3843* (2013.01)

(58) Field of Classification Search
USPC .............................. 367/16–20; 114/244, 245
See application file for complete search history.

(56) References Cited

U.S. PATENT DOCUMENTS

| | | | |
|---|---|---|---|
| 4,078,510 A | 3/1978 | Morgan | |
| 4,781,140 A | 11/1988 | Bell et al. | |
| 6,009,042 A * | 12/1999 | Workman et al. | 367/15 |
| 7,411,863 B2 | 8/2008 | Toennessen | |
| 2004/0066707 A1 * | 4/2004 | Tenghamn et al. | 367/15 |
| 2005/0219948 A1 | 10/2005 | Naess | |
| 2008/0008042 A1 * | 1/2008 | Frivik et al. | 367/99 |
| 2010/0254216 A1 | 10/2010 | Toennessen | |
| 2011/0103179 A1 * | 5/2011 | Vageskar et al. | 367/17 |
| 2012/0275265 A1 * | 11/2012 | Nielsen et al. | 367/20 |
| 2012/0287751 A1 * | 11/2012 | Elvestad | 367/16 |
| 2013/0033960 A1 * | 2/2013 | McKey, III | 367/16 |

* cited by examiner

*Primary Examiner* — Ian J Lobo

(57) ABSTRACT

Marine survey. The various embodiments includes both methods and systems. At least some of the illustrative embodiments are methods including: deploying a spreader structure from vessel into a body of water, wherein the spreader structure defines a deployed width of one kilometer or more; coupling a plurality of sensor streamers to the spreader structure; and towing the plurality of sensor streamers through the water, where the horizontal separation between the sensor streamers is at least partially maintained by the spreader structure. The spreader structure provides horizontal separation sensor streamers without the use of a tensioning force applied to the spreader structure.

31 Claims, 9 Drawing Sheets

METHOD AND SYSTEM OF MARINE SURVEY

BACKGROUND

Marine surveys may be used to determine the location and/or state of a hydrocarbon bearing earth formation residing below a body of water. Marine surveys using towed survey streamers may use ten or more survey streamers spaced horizontally, with the survey streamers towed behind a tow vessel and in proximity to the hydrocarbon bearing earth formation. In the related art, horizontal separation for the survey streamers is provided by two paravanes, where the paravanes develop opposing forces that tension a spreader cable as the paravanes are towed through water. Thus, a large portion of the towing force developed by the tow vessel is used just to keep the survey streamers properly horizontally spaced.

Also in the related art, each survey streamer is communicatively coupled to the tow vessel by way of a lead-in cable extending between the tow vessel and a respective location of the survey streamer on the spreader cable. While the lead-in cable for any particular survey streamer may carry little, if any, towing force, the lead-in cables themselves contribute to drag, and thus increase the amount of towing force the tow vessel must develop.

In order to ensure good reception of signals at the survey streamers, the survey streamers should be at a particular depth. The particular depth is dependent on a variety of factors, such as depth of the hydrocarbon bearing earth formation for which the survey is being performed, and the frequency of the interrogating energy used to probe the earth formation. In order to achieve the desired depth, some related art systems use devices known as "suppressors" which tend to dive with motion through the water. Such suppressors also contribute to required towing force.

The towing force associated with a large marine survey may be large. The amount of fuel used by the tow vessel is proportional to towing force developed by the tow vessel. It follows that reduction in towing force used may result in reduced overall cost of performing a marine survey.

BRIEF DESCRIPTION OF THE DRAWINGS

For a detailed description of exemplary embodiments, reference will now be made to the accompanying drawings in which.

NOTATION AND NOMENCLATURE

Figure 1:
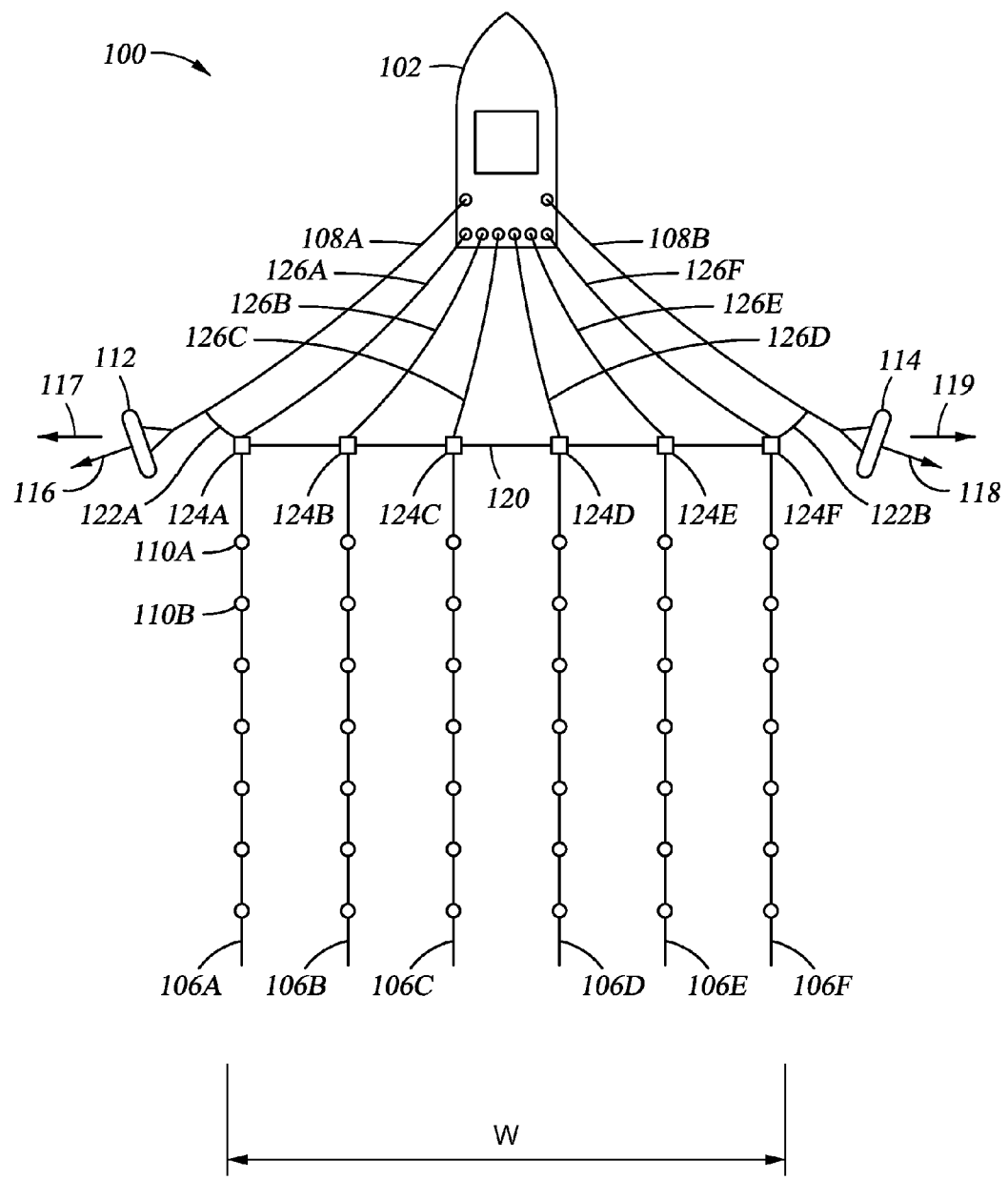
FIG. 1 shows a system that uses paravanes to provide lateral separation of sensor streamers.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Spreader structure" shall mean a structure that provides horizontal separation between two points more than 10 meters apart as the spreader structure is towed through water, the providing of horizontal separation without the use of a tensioning force applied to the spreader structure.

"Chord" shall mean an imaginary straight line joining a leading edge and a trailing edge of the spreader structure along the direction of travel when in use in a marine survey.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

The various embodiments are directed to a spreader structure that provides horizontal separation of sensor streamers as the streamers are towed through the water, and where the horizontal separation is provided without an external tensioning force, like forces provided by paravanes. By providing horizontal separation without the use of paravanes, and in some cases a reduced number of lead-in cables, the towing force is reduced, along with a corresponding reduction in fuel consumption by the tow vessel. Moreover, the spreader structure may provide better depth control, which results in higher quality marine surveys. The specification first turns to related art systems to better frame the difficulties, and then discusses spreader structures in accordance with various embodiments.

FIG. 1 shows an overhead view of related art marine survey system 100. In particular, FIG. 1 shows a tow vessel 102 configured to tow one or more sensor streamers 106A-F through water. FIG. 1 shows only six streamers 106, but in some cases as many as 20 streamers may be used which may result in a horizontal width W of about 2 kilometers. The horizontal separation between the sensor streamers 106 is maintained by spreader lines 120, paravane 112, and paravane 114. In particular, two paravane tow lines 108A and 108B couple on one end to the vessel 102, and couple on a second end to paravanes 112 and 114, respectively. The paravanes 112 and 114 are each configured to provide a lateral force component to the various elements of the survey system as the paravanes are towed through the water. Lateral in this context means transverse to the direction of motion of the tow vessel 102. The lateral force component of paravane 112 is opposite that of paravane 114. For example, paravane 112 may create a force as illustrated by arrow 116, and the lateral component of force 116 is shown by arrow 117. Likewise, paravane 114 may create a force as illustrated by arrow 118, and the lateral component of force 118 is shown by arrow 119. The combined lateral forces of the paravanes 112 and 114 separate the paravanes from each other and put one or more spreader lines 120 (coupled to the paravanes by spur lines 122A-B) into tension.

The sensor streamers 106 are coupled, at the ends nearest the vessel 102, to a respective lead-in cable termination 124A-F. The lead-in cable terminations 124 are coupled to or are associated with the spreader lines 120 so as to control the lateral positions of the sensor streamers 106 with respect to each other and with respect to the vessel 102. Electrical and/or optical connections between the appropriate components in a recording system on the tow vessel and the sensors (e.g., 110A, 110B) in the streamers 106 is made using inner lead-in cables 126A-F. Though not necessarily contributing to the towing forces used to move the sensor streamers 106 through the water, the lead-in cables 126A-F contribute drag.

Though not specifically shown in the view of FIG. 1, each survey streamer 106 is associated with a "suppressor" or "deflector", which provides a diving force with motion through the water. The suppressors may be provided to help set depth of the sensor streamers 106 as the suppressors and streamers are towed through the water.

The amount of drag created by the various paravanes, suppressors, and lead-in cables is very large. Simulations run regarding a towing scenario similar to that of FIG. 1 (12 streamers with 100 meter separation, 7100 meter sensor streamer length, and a speed of 4.5 knots) indicates the paravanes and lead-in cables alone contribute between 65 and 85 tons of drag. Large drag dictates creation of large towing force by the tow vessel 102. Not only does the large towing force dictate the size of the vessel, but the amount of fuel used to create the towing force is directly proportional to the magnitude of the towing force. A single company performing marine surveys internationally may have yearly fuel expenses in the hundreds of millions of dollars. If the towing force needed to perform seismic surveys could be reduced even by a relatively small percentage (e.g., 5%), the economic impact on fuel consumption would be substantial, not to mention the reduced environmental impact.

Figure 2:
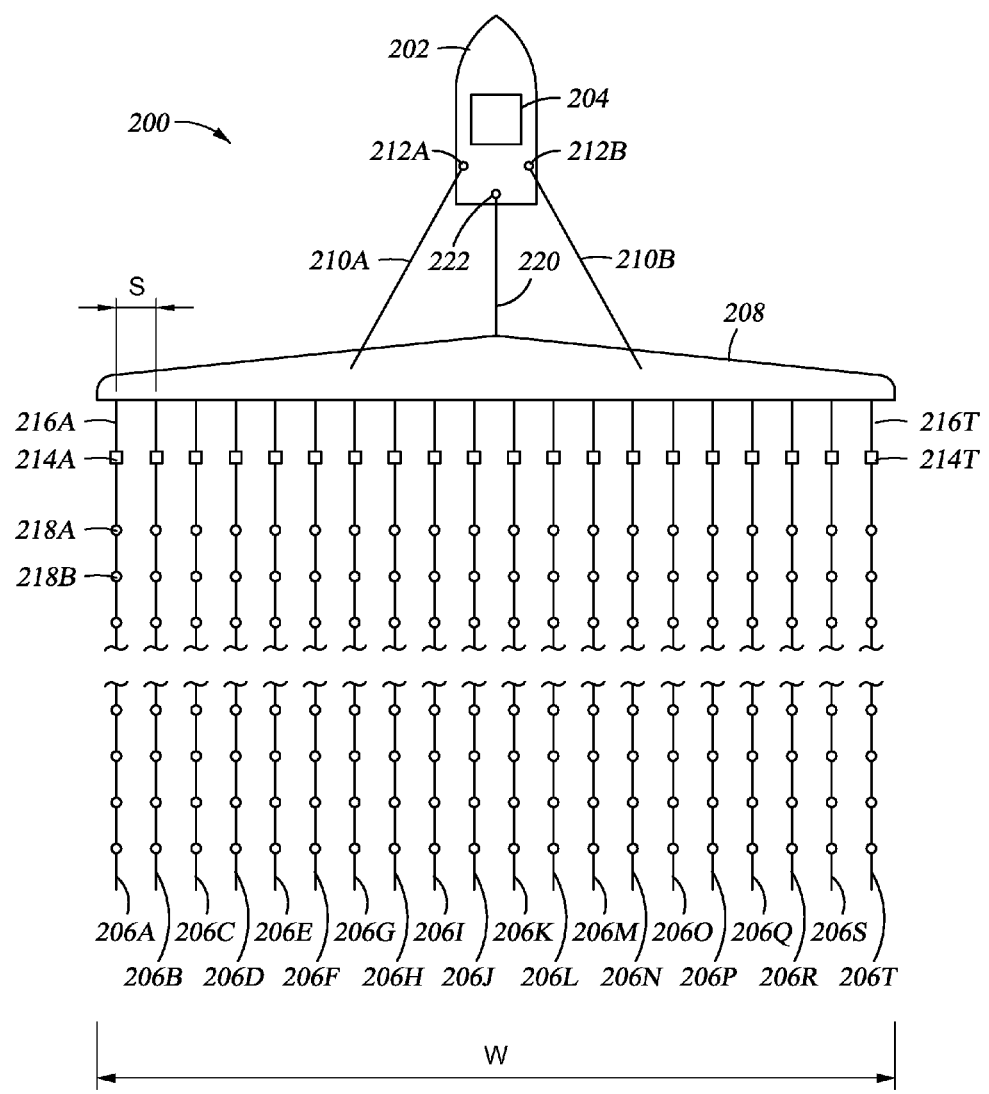
FIG. 2 shows an overhead view of a survey system in accordance with at least some embodiments.

FIG. 2 shows an overhead view of a marine survey system 200 in accordance with at least some embodiments. In particular, FIG. 2 shows a tow vessel 202 having onboard equipment 204, such as navigation, energy source control, and data recording equipment. Sensor vessel 202 is configured to tow one or more sensor streamers 206A-T through the water. FIG. 2 illustratively shows twenty sensor streamers 206, but higher or lower numbers of sensor streamers may be used, and with a variety of spacing between the sensor streamers 206. For example, with twenty sensor streamers 206 having spacing S of 100 meters, the overall horizontal width W may be 2 kilometers. Other examples are: ten sensor streamers 206 with 150 meter horizontal spacing S, resulting in a horizontal width W of 1.5 kilometers; ten sensor streamers 206 with 200 meter horizontal spacing S, resulting in a horizontal width W of 2.0 kilometers. Many additional configurations are also possible.

In the illustrated embodiment the sensor streamers 206 are mechanically and communicatively coupled to spreader structure 208. Spreader structure 208 is a structure that provides lateral or horizontal separation between the sensor streamers 206 as the spreader structure 208 and sensor streamers 206 are towed through water. Unlike the related art systems, however, the spreader structure 208 provides the horizontal separation without the use of an externally supplied tensioning force (i.e., without the use of paravanes). Illustrative spreader structure 208 couples to the tow vessel 202 by way of tow lines 210A and 210B. The tow lines 210A and 210B may each couple to the vessel 202 by way of winches 212A and 212B, respectively. The winches enable changing the deployed length of each of the tow lines 210, and thus enable changing the distance between the tow vessel 202 and the spreader structure 208. In the illustrative embodiments of FIG. 2, the tow lines 210 provide more than half, and in some cases all or substantially all, the towing force for the trailing components (spreader structure and components coupled to the spreader structure).

The sensor streamers 206 are coupled, at the ends nearest the vessel 202, to a respective cable termination 214A-T (only 214A and 214T expressly labeled so as not to unduly complicate the figure). As illustrated, each cable termination 214 is associated with a respective harness 216A-T (only 216A and 216T expressly labeled so as not to unduly complicate the figure). The harnesses 216 may serve several useful purposes, discussed more below. If used, each harness may be on the order of 50 meters in length (measured from the spreader structure 208 to the cable termination 214). If harnesses 216 are not used, the cable terminations 214 will be accessible on an outer trailing surface of the spreader structure 208. Electrical and/or optical connections between the appropriate components in the on-board system 204 and the sensors (e.g., 218A, 218B) in the streamers 206 may be made using cable terminations 214A-T. The various electrical and/or optical conductors run along the harnesses 216, and then within an interior volume of the spreader structure 208, and then couple to electronics of the on-board equipment 204 of the tow vessel 202 by way of lead-in cable 220. Lead-in cable 220 may couple to the tow vessel 202 by way of winch 222, such that the length of the lead-in cable 220 may be adjusted. In some embodiments, the lead-in cable 220 does not contribute to the towing force the spreader structure. In still further embodiments, the lead-in cable 220 also contributes to the towing force. For example, the towing force may be equally divided among the lines and cables coupled between the tow vessel 202 and the spreader structure 208.

The spreader structure 208 provides horizontal spacing of the streamers 206 without the need of paravanes providing an external tensioning force. Thus, use of the spreader structure 208 reduces the amount of drag created, and correspondingly reduces the amount of towing force the tow vessel 202 creates to tow the sensor streamers 206. Moreover, use of the spreader structure 208 reduces the number of tow lines and lead-in cables. As illustrated, the tow lines are reduced to two, and the lead-in cables are reduced to one. Reducing the number of tow lines and lead-in cables likewise reduces the amount of drag created, and correspondingly reduces the amount of towing force the tow vessel 202 uses to tow the sensor streamers 206.

Figure 3:
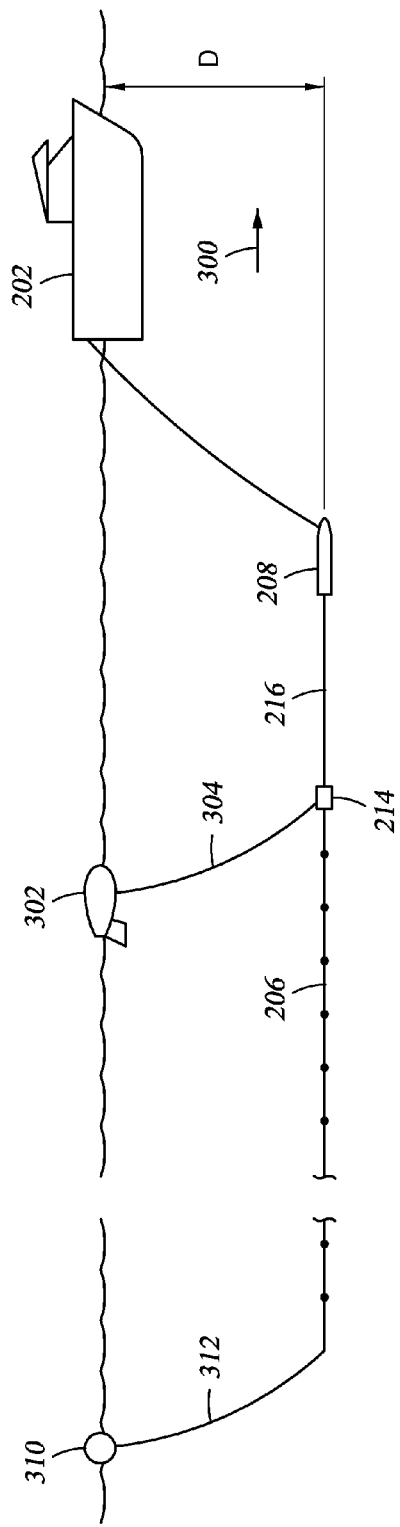
FIG. 3 shows a side elevation view of a survey system in accordance with at least some embodiments.

FIG. 3 shows a side elevation view of the system 200 of FIG. 1. In particular, FIG. 3 shows tow vessel 202 towing the spreader structure 208 and sensor streamers 206 (only one sensor streamer visible in FIG. 3) through the water in the direction indicated by arrow 300. The depth D of the spreader structure 208, and thus the sensor streamers 206, may vary from survey-to-survey, but in most cases will be set in a range of about 5 to 25 meters. In the illustration of FIG. 3, a tow harness 216 separates the spreader structure 208 from the cable termination 214.

FIG. 3 further shows that in some embodiments (e.g., embodiments that utilize tow harnesses 216) each sensor streamer 206 may be associated with a lead buoy 302. Lead buoy 302 may couple by way of line 304 to a point proximate to the cable termination 214. Stated otherwise, the line 304 may coupled near the distal end of each tow harness. The lead buoy 302 may serve several purposes. For example, in some cases the lead buoy 302 marks the approximate position of the proximal portion of the sensor streamer 206. Additionally, the lead buoy 302 and line 304 may act to set depth and/or fully or partially support the sensor streamer 206.

Figure 4:
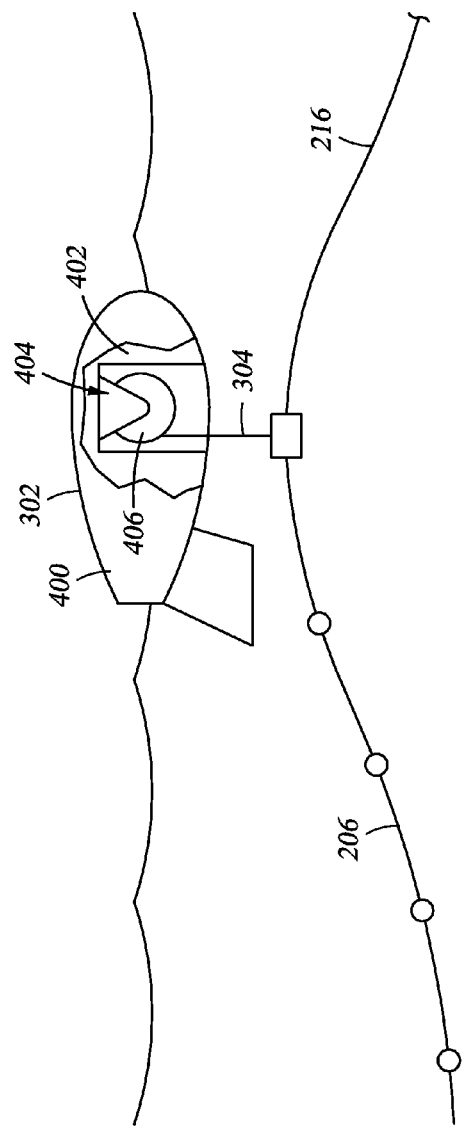
FIG. 4 shows a side elevation, partial cut-away, view of a lead buoy in accordance with at least some embodiments.

In some cases, each lead buoy 302 may have a winch on which line 304 is spooled. Thus, not only can the buoy 302 and line 304 be used to set depth of the sensor streamer 206, the winch may be used to bring the sensor streamer 206 to the surface for maintenance and/or replacement. FIG. 4 shows a side elevation, with partial cut-away, view to illustrate various embodiments. In particular, the buoy 302 defines an outer surface 400 as well as an internal volume 402. Disposed within the internal volume 402 is a winch 404 having spool 406. The line 304 is wound around the spool 406, and thus length of the line 304 extending from the buoy 302 may be adjusted. The proximal portion of the sensor streamer 206 may be brought to or near the surface by spooling in the line 304. In this way, the sensor streamer 206 may be removed and replaced if needed. Moreover, FIG. 4 illustrates that by use of a tow harness 216, any particular survey streamer may be brought to or near the surface without the need to bring to the surface the spreader structure 208 or any of the remaining survey streamers. Such an operational mode may be desirable, particularly in areas with high surface traffic where the spreader structure 208 and/or survey streamers 206 would be exposed to potential damage by collisions with surface traffic.

Returning to FIG. 3, each sensor streamer 206 may further comprise a tail buoy 310. The tail buoy 310 may serve several purposes. For example, in some cases the tail buoy 310 marks the approximate position of the distal portion of the sensor streamer 206. Additionally, the tail buoy 310 and line 312 may act to set depth and/or fully or partially support the sensor streamer 206. The specification now turns to a more detailed description of the spreader structure 208.

Figure 5:
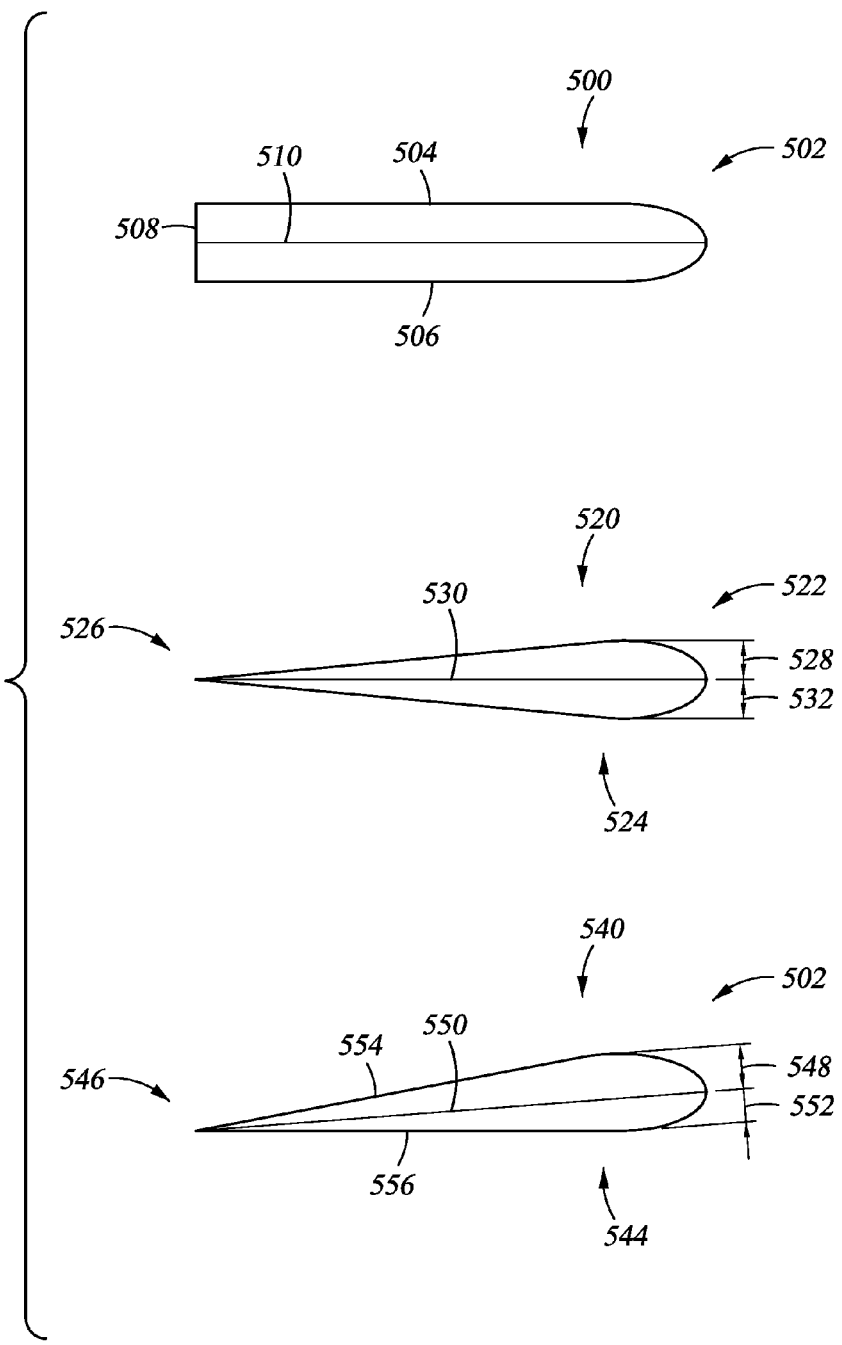
FIG. 5 shows a cross-sectional view of example spreader structures in accordance with at least some embodiments.

In accordance with various embodiments the spreader structure 208 has a cross-sectional shape with hydrodynamic properties that are favorable for reducing drag. In particular, FIG. 5 shows three example cross-sectional shapes for the spreader structure 208. The example cross-sectional shapes of FIG. 5 do not speak to internal components or construction of the spreader structure 208. Flat shape 500 defines a rounded leading edge 502, with straight top side 504 and straight bottom side 506, where the top side 504 and bottom side 506 are substantially parallel. Moreover, illustrative flat shape 500 defines an abrupt trailing edge 508. In this illustrative case the trailing edge defines a plane perpendicular to the planes defined by either the top 504 or bottom 506 surface. While perhaps less overall hydro-dynamically favorable than other example cross-sectional shapes discussed below, the flat shape 500 may provide good stability and rigidity, given the relatively constant thickness along the chord 510.

The second example cross-sectional shape is that of a symmetric airfoil 520. In particular, symmetric airfoil 520 defines a rounded leading edge 522, with a maximum thickness (at location 524) closer to the leading edge 522 than the trailing edge 526. The maximum upper camber 528 (measured from the chord 530) is equal to the maximum lower camber 532 for the illustrative symmetric airfoil. The symmetric airfoil tapers from the point of maximum thickness 524 toward the trailing edge.

The third example cross-sectional shape is that of a non-symmetric airfoil 540. In particular, non-symmetric air foil 540 defines a rounded leading edge 542, with a maximum thickness (at location 544) closer to the leading edge 542 than the trailing edge 546. The maximum upper camber 548 (measured from the chord 550) is greater than the maximum lower camber 552 for the illustrative non-symmetric airfoil. The non-symmetric airfoil tapers from the point of maximum thickness 544 toward the trailing edge. The non-symmetric airfoil 520 provides a lifting or surfacing force because of the difference in distance over the upper surface 554 as compared to the lower surface 556 (Bernoulli's principle). The illustrative non-symmetric cross-sectional shape may be inverted in some embodiments (longer surface facing down), such that movement through water develops a diving force.

No dimensions are discussed with respect to the illustrative cross-sectional shapes of FIG. 5. As shown in FIG. 1, the spreader structure 208 may be larger at the center, and taper toward the outer portions. Thus, though in some cases defining the same cross-sectional shape along the entire spreader structure 208, the chord lengths may be greatest at the center, and smaller toward the outer edges. Likewise, in cases where the better hydrodynamic shape is based on the relationships between chord length and camber, the cambers at the center may be larger, and taper toward the outer edges. Other cross-sectional shapes may be used, and combinations of cross-sectional shapes may be used. For example, possibly for strength, inner portions of the spreader structure 208 may have the flat 500 cross-sectional shape, and outer portions having one of the airfoil 520 and/or 540 shapes.

Some embodiments of the spreader structure 208 may span a horizontal width of at least one kilometer, and in some cases may span a horizontal width of about two kilometers (i.e., just over 6500 feet). Regardless of the material used to construct the spreader structure 208 (example constructions discussed below), the spreader structure 208 will be subject to flexing at least along the horizontal width. The flexing may be based on many external causes. For example, one portion of the spreader structure 208 may encounter water currents tending to submerge the spreader structure 208, while another portion of the spreader structure 208 may encounter water currents tending to surface the spreader structure 208. Another external cause may be temperature and salinity of the surrounding water. In most cases, the spreader structure 208 will be neutral to slightly positively buoyant. However, with a horizontal width of one kilometer or more, one portion of the spreader structure 208 may encounter water of different density and/or temperature than another portion of the spreader structure 208 causing the buoyancy of the portions to be different (e.g., one end of the spreader structure enters a fresh water from a river before the second portion, or one end of the spreader structure enters a thermal gradient before the second end).

Regardless of the cause for the flexing, the spreader structure 208 in accordance with various embodiments has one or more systems to assist in maintaining depth of the spreader structure 208 (i.e., provides depth control). Moreover, because of the differences in depth that may occur because of flexing of the spreader structure 208, the spreader structure 208 may be logically (though not necessarily physically) divided into different portions or sections, with each section having one or more systems to assist in maintaining depth of that section.

Figure 6:
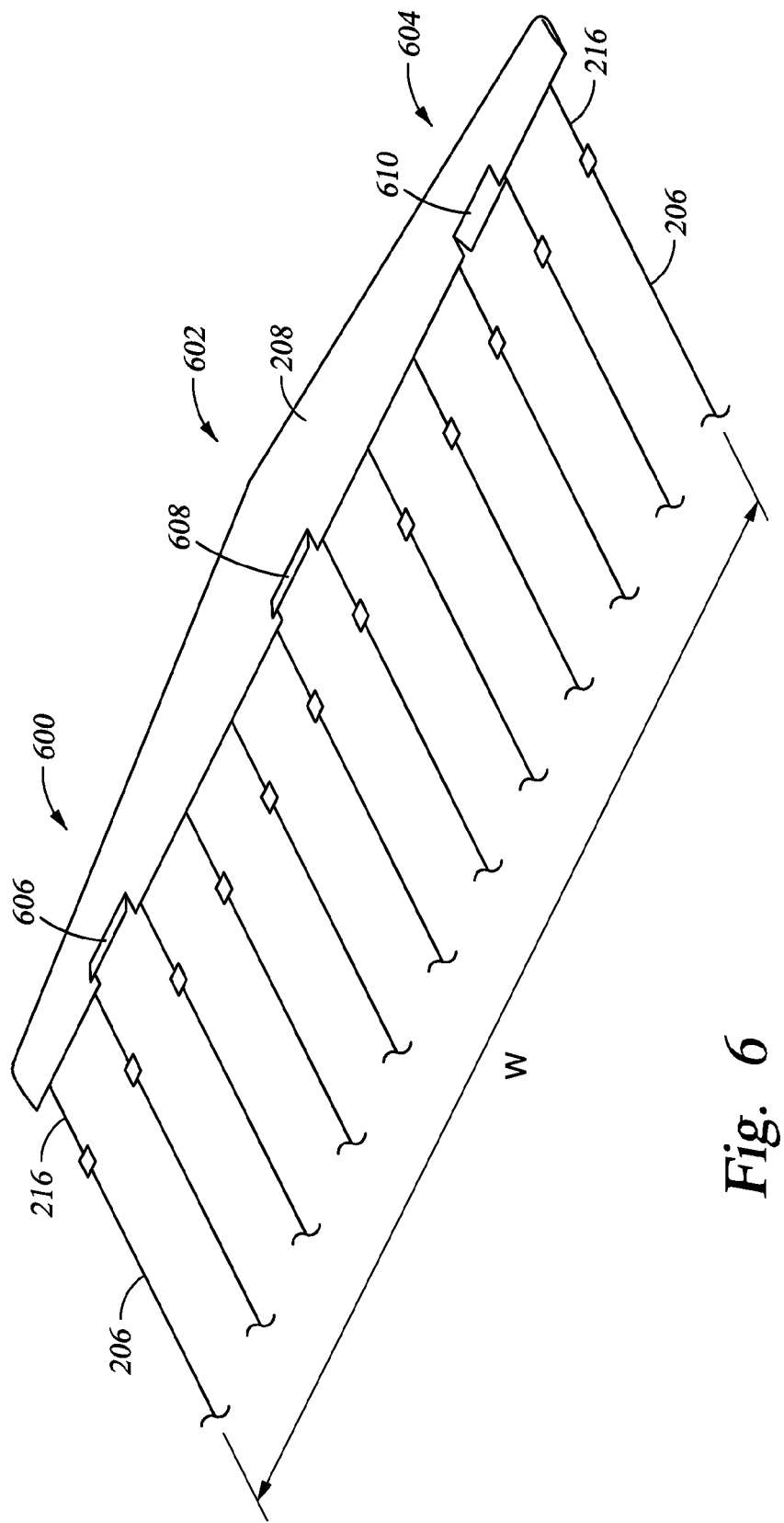
FIG. 6 shows a perspective view of a spreader structure in accordance with at least some embodiments.

FIG. 6 shows a perspective view of a spreader structure 208 in accordance with at least some embodiments. In particular, FIG. 6 shows spreader structure 208, along with harnesses 216, and sensor streamers 206. In the illustrative embodiments of FIG. 6, the spreader structure 208 is logically divided into three spreader portions or spreader sections 600, 602, and 604. Each spreader section 600, 602, and 604 has a depth control system, here shown as control surfaces 606, 608, and 610, respectively. Each control surface is disposed at a horizontal location along the width W of the spreader structure 208. As illustrated, each control surface is deflectable. Control surfaces 606 and 608 are illustratively shown deflected upwardly, while control surface 610 is illustratively shown deflected downwardly.

As the spreader structure 208 is towed through the water, to the extent any spreader section changes depth from a desired depth level (e.g., a set point in a range from 5 to 25 meters), the control surface for that spreader section may deflect in an attempt to change the depth to the desired depth point. For example, if spreader section 600 is below a set-point depth, then the control surface 606 may deflect upwardly as shown. The illustrative upward deflection causes a force tending to change the depth of the spreader section 600, in this illustrative case a force tending to bring the spreader section more shallow. As another example, if spreader section 604 is above a set-point depth, then the control surface 610 may deflect downwardly as shown. The illustrative downward deflection causes a force tending to change the depth of the spreader section 604, in this illustrative case a force tending to further submerge the spreader section. While in some operational modes or circumstances the control surfaces 606, 608, and 610 may deflect in unison (e.g., to bring the spreader structure to the surface for maintenance), in other operational modes or circumstances the control surfaces 606, 608, and 610 act independently based on the depth of the spreader section. Thus, control surfaces on the same spreader structure 208 may simultaneously deflect oppositely if the operational circumstance dictates.

While FIG. 6 illustratively shows only three control surfaces 606, 608, and 610 so as not to unduly complicate the figure, greater and fewer control surfaces may be used. For example, in embodiments where the spreader structure 208 has a horizontal width W of two kilometers, twenty or more control surfaces may be used. In the example situation of twenty harnesses 216 with 100 meter spacing, a control surface may be implemented proximate to each harness 216 to provide depth control for the spreader section proximate the harness 216 (and thus most likely to affect the depth of the associated sensor streamer). Moreover, while the illustrative control surfaces 606, 608, and 610 are shown on the trailing edge of the spreader structure, what is changed by the control surfaces is lift, and thus other placements where deflection changes lift are contemplated (e.g., the leading edge, and sets of control surfaces with one on the upper surface and another on the lower surface).

Figure 7:
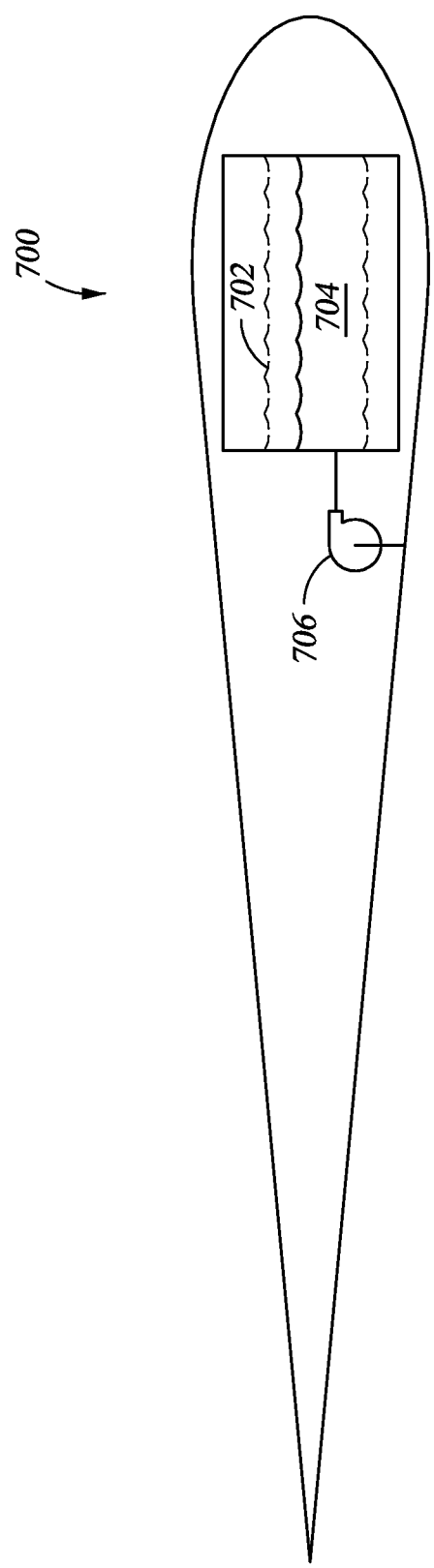
FIG. 7 shows a cross-sectional view of a spreader structure, with buoyancy control system, in accordance with at least some embodiments.

Other systems to control depth of the spreader structure may be used in place of, or in combination with, the control surfaces discussed with respect to FIG. 6. For example, spreader sections may implement controllable ballast tanks, where the amount of water within each tank may be controlled to control buoyancy of a portion of the spreader structure. FIG. 7 shows a simplified cross-sectional view of a spreader section with a buoyancy control portion 700. In particular, FIG. 7 shows a tank 702 having water 704 therein. The tank is fluidly coupled to a pump 706 which is configured to pump water into the tank 702, or out of the tank 702, as desired. In some cases, the pump 706 may be bi-directional, having the ability to pump water both in and out of the tank 702. In other cases, controllable valves may selectively change the suction and discharge fluid connections to implement pumping water in or out of the tank. In yet still other embodiments, the pump 706 is representative of other systems to enable water flow into and out of the tank 700, such as compressed air systems which vent the tank 702 to enable water to enter, and which pressurize the tank 702 to force water out of the tank.

FIG. 7 shows a single buoyancy control portion 700 in a simplified form. While in some cases a single tank may span a significant portion of the spreader structure 208, thus enabling buoyancy control of the spreader structure 208 as a whole, in other embodiments a plurality of buoyancy control portions may be spaced about the horizontal width of the spreader structure 208. For example, in FIG. 6 three control surfaces are spaced about the spreader structure 208 along the horizontal width. In some embodiments, a buoyancy control portion 700 may be disposed proximate to each control surface, and thus in the example the spreader structure 208 would implement three such buoyancy control portions. In other cases, the buoyancy control portions may be implemented without corresponding control surfaces, or between control surfaces.

Figure 8:
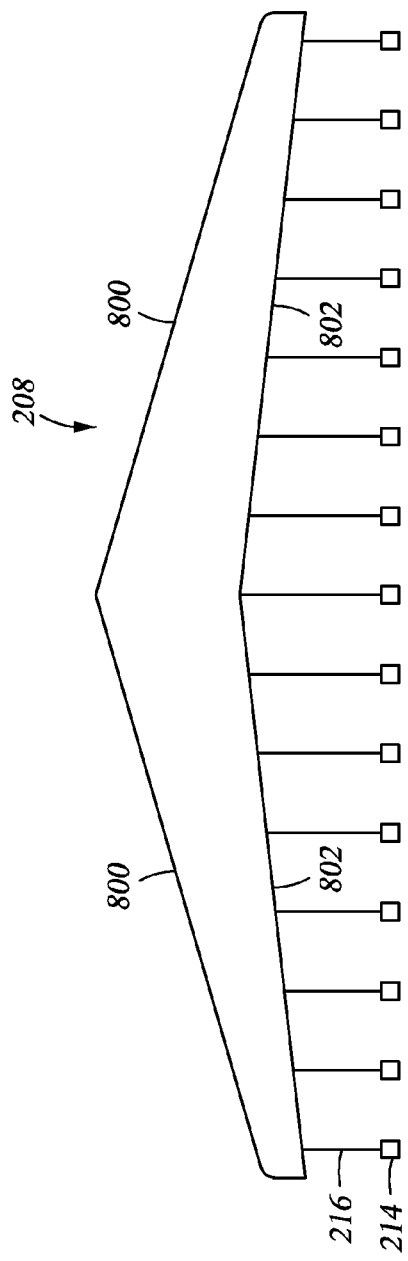
FIG. 8 shows an overhead view of a spreader structure in accordance with at least a first category of embodiments.

As the spreader structure 208 is towed through the water, to the extent any spreader section changes depth from a desired depth level a buoyancy control portion for that spreader section may operate to change buoyancy in an attempt to change the depth to the desired depth point. For example, if spreader section is below a set-point depth, then the buoyancy control portion 700 associated with the spreader section may pump water from the tank, thus making the spreader section positively buoyant, or perhaps more positively buoyant. The illustrative positive buoyancy causes a force tending to bring the spreader section more shallow. As another example, if a spreader section is below a set-point depth, then the buoyancy control portion associated with the spreader section may pump water into the tank, thus making the spreader section negatively buoyant, or perhaps more negatively buoyant. The illustrative negative buoyancy causes a force tending to further submerge the spreader section. While in some operational modes or circumstances the buoyancy control portions may act in unison (e.g., to bring the spreader structure to the surface for maintenance), in other operational modes or circumstances the buoyancy control portions act independently based the depth of the spreader section. Thus, buoyancy control portions on the same spreader structure 208 may simultaneously change buoyancy oppositely if the operational circumstance dictates. In the example embodiments of the spreader structure 208 discussed with the respect to FIGS. 2 and 6, the shape of the spreader structure when viewed from above (i.e., projection into a horizontal plane) is that of a swept leading edge, and flat or straight trailing edge. Other shapes may be used. For example, FIG. 8 shows an overhead view of spreader structure 208 in accordance with other embodiments. In particular, the spreader structure 208 of FIG. 8 has both a swept leading edge 800, as well as swept trailing edge 802.

FIG. 8 also illustrates another use for the harnesses 216. In particular, FIG. 8 illustrates harnesses 216, along with respective cable termination 214. In the swept wing embodiments of the spreader structure 208 of FIG. 8, the harnesses have varying lengths to compensate for the sweep of the trailing edge 802. In this way, the cable terminations 216 all reside at approximately the same horizontal location. Stated otherwise, a straight line may pass through all the cable terminations 214, and the straight line is substantially perpendicular to the direction of travel.

The various embodiments discussed to this point have been from the perspective of operation of the spreader structure 208 in marine surveys. While a particular spreader structure 208 may spend a significant amount of time in one general geographic location, there may be need to move the spreader structure to a remote destination. Thus, the specification now turns to aspects of transportation regarding the spreader structure 208.

In some embodiments the spreader structure 208 is a single unit, and thus may be considered a vessel in-and-of itself. When transporting the spreader structure 208 as a single unit, the spreader structure may be towed along its horizontal width (i.e., towing direction substantially perpendicular to the chord of the spreader structure during towing for marine survey purposes). Stated otherwise, the towing orientation for transport may be 90 degrees of angle from the survey orientation. Towing along the horizontal width may reduce drag for long distance relocation. The towing may be with the spreader structure at the surface, or submerged.

Figure 9:
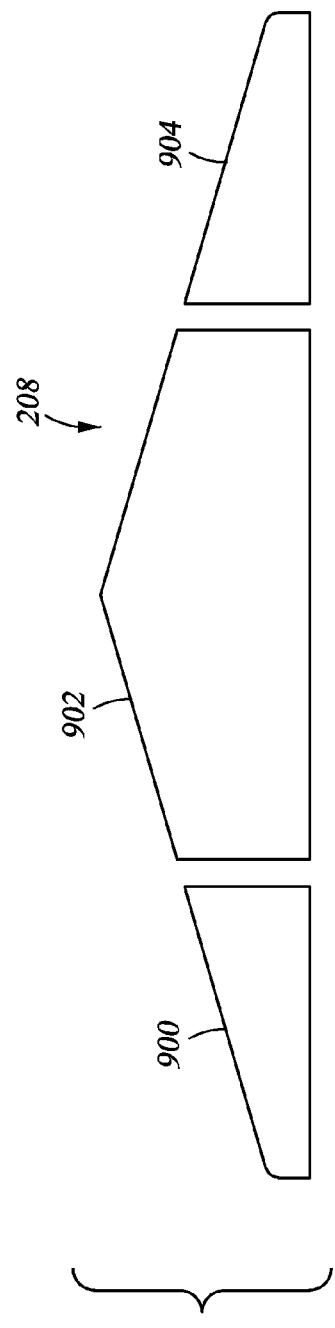
FIG. 9 shows an overhead view of a spreader structure in accordance with at least a second category of embodiments.

However, for political reasons (e.g., import and export laws), there are certain advantages to the spreader structure being considered a part of the ship's equipment by being stowed for travel on the travel vessel. Inasmuch as the horizontal width of the spreader structure may be longer than the length of the vessel which will carry spreader structure 208, in some embodiments the spreader structure is comprised of a plurality of individual spreader sections. FIG. 9 shows an overhead view of a spreader structure 208 comprising individual spreader sections in accordance with at least some embodiments. In particular, FIG. 9 shows a spreader structure 208 comprising three illustrative spreader sections 900, 902, and 904. When use of the spreader structure 208 is complete and the structure 208 is to be relocated, the various spreader sections 900, 902, and 904 may be disassembled, taken aboard the travel vessel (which may be the same as the tow vessel 202), and transported to the next location. Having three spreader sections 900, 902, and 904 is merely illustrative. Any number of spreader sections may be implemented, which in some cases may be dictated by the size of the storage locations on the travel vessel. For example, a spreader structure having an assembled horizontal width of one kilometer may be comprised of ten spreader sections 100 meters in horizontal width. The illustrative ten spreader sections may be held in racks or compartments just over 100 meters in length for relocation, and then deployed at the destination location.

Given the horizontal width of the spreader structures 208 of the various embodiments, deploying the spreader structure 208 comprising individual spreader sections may involve coupling a first spreader section to a second spreader section, placing at least a portion of the first spreader section into water, and then coupling a third spreader section to the second spreader section. Each time an additional spreader section is coupled, the spreader structure 208 may be deployed further into the water, and the cycle continued until the entire spreader structure 208 has been assembled and is afloat.

Disassembling the spreader structure 208 may be implemented as the reverse of deploying. In particular, a first spreader section may be fully or partially taken aboard, and de-coupled from the adjoining spreader section. Once de-coupled, the next spreader section is fully or partially taken aboard, and de-coupled from the adjoining spreader section. The cycle is repeated until all the individual spreader sections have been de-coupled from each other and taken aboard. In yet still other cases, assembly and disassembly may be accomplished with the spreader sections in the water, either at the surface or below the surface, by way of divers or remotely operated vehicles.

Many mechanisms may be used to couple the individual spreader sections, with the mechanisms selected, at least in part, based on the materials with which the spreader structure 208 is constructed. In some cases, fasteners such as bolts may be used. In other cases, tab and slot arrangements may be used, in some cases multiple tab and slot arrangement at each junction of two spreader sections.

In addition to mechanically coupling between spreader sections, there may also be communicative coupling between spreader sections (e.g., for the communication buses associated with survey streamers, and communication buses for communication with depth control systems in the respective spreader sections). Further still, power may need to be distributed about the spreader structure 208 to operate various functionality (e.g., power to operating pumps for buoyancy control, power to operation motors to provide energy to deflect control surfaces), and thus electrical connections may be made between spreader sections. The energy used to operate the various functionality need not be electrical, as the energy may be provided by way of hydraulic fluid, and thus in addition to, or in place of, electrical connections, hydraulic connections may be made between spreader sections.

Figure 10:
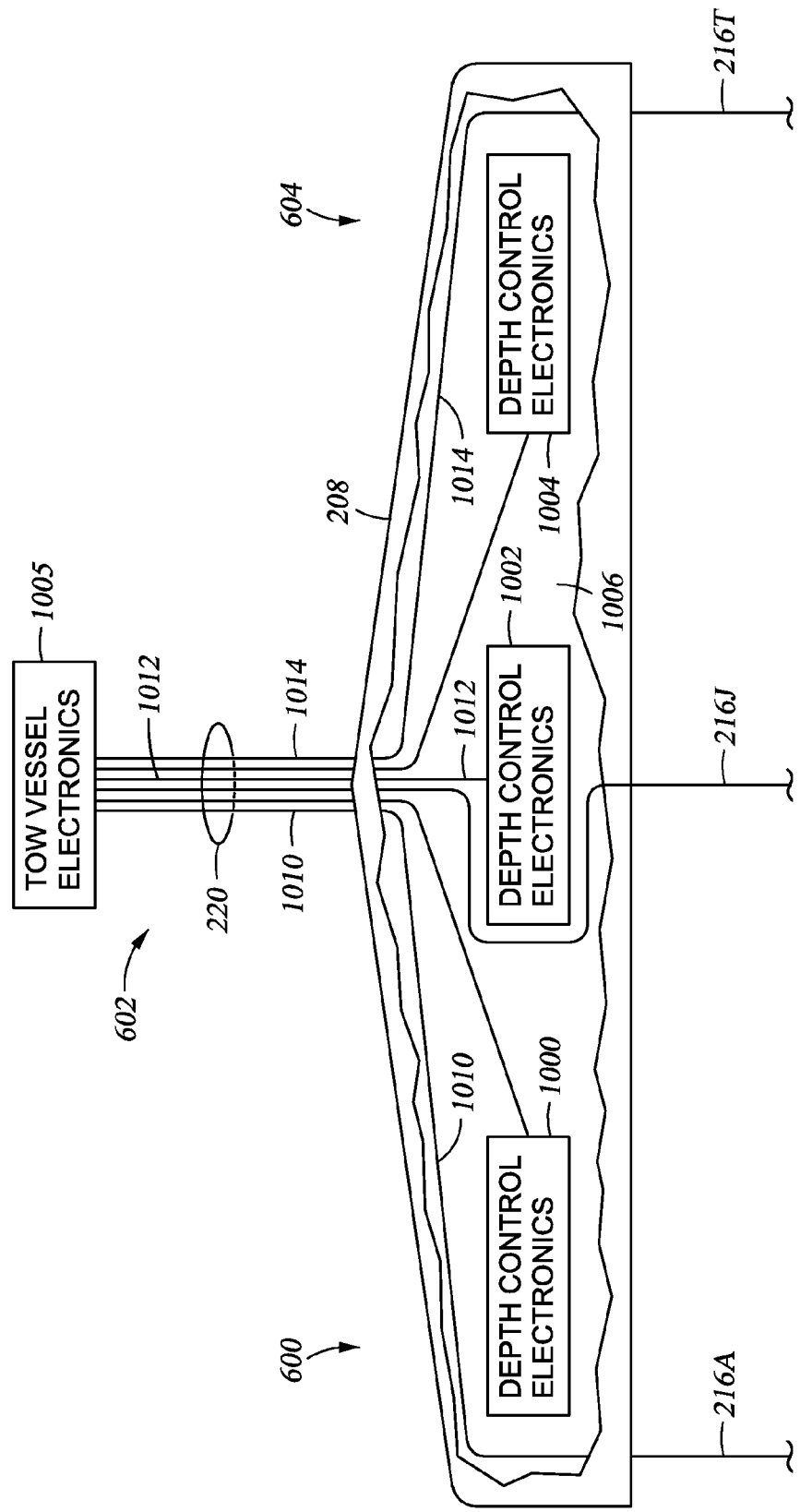
FIG. 10 shows a block diagram, partial cut-away view, of a system including a spreader structure in accordance with at least some embodiments.

FIG. 10 shows an electrical block diagram and a partial cut-away view of the spreader structure 208 in accordance with at least some embodiments. In particular, FIG. 10 shows that illustrative spreader sections 600, 602, and 604 may comprise depth control electronics 1000, 1002, and 1004. The depth control electronics are disposed within an internal volume 1006 of the spreader structure 208. The depth control electronics communicatively couple to the tow vessel electronics 1005 by way of the lead-in cable 220. The communicative coupling may be by any suitable communication system, such as electrical or optical conductors. In some cases, the depth control electronics are reactive components, executing instructions received from the tow vessel electronics 1005, such as commands to change depth (e.g., by deflection of a control surface, and/or changing buoyancy). In other cases, the depth control electronics provide active control based on intermittent communication with the tow vessel electronics. For example, the tow vessel electronics 1005 may provide a set point depth to the depth control electronics, and the depth control electronics may act to achieve the set point depth without further instructions from the tow vessel electronics. In the active case, the depth control electronics may implement a depth measurement system (e.g., pressure transducer, or surface sounding device), and make control changes based on the measured or time averaged depth of the respective spreader section. In other cases, rather than implementing control changes to achieve a set point depth, the depth control electronics may measure flexing or deflection of the spreader structure 208, and implement control changes in an attempt to keep the spreader structure relatively planar. For example, by way of a series of strain gauges, the magnitude and direction of deflection of the spreader structure may be measured, and control changes made to keep the spreader structure 208 relatively planar. Stated more generally then, a spreader structure 208 spanning a kilometer or more in some cases will utilize an active control system to maintain the spreader structure in a substantially planar orientation, to reduce the likelihood of buckling.

While FIG. 10 shows three depth control systems 1000, 1002, and 1004 associated with spreader sections 600, 602, and 604, any number of depth control systems may be equivalently used (e.g., one depth control section for every 100 meter spreader section). Moreover, even in cases where control changes are made in an attempt to keep the spreader structure 208 planar, such changes to keep the spreader structure 208 planar still result in depth changes, and thus shall still be considered depth control for purposes of the claims.

FIG. 10 also shows three illustrative tow harnesses 216 in order to show the communicative coupling of the tow harnesses (and more particularly the sensor streamers (not shown in FIG. 10) to the tow vessel electronics. In particular, each tow harness has a respective communication channel disposed within the interior volume of the spreader structure 208. For example, tow harness 216A has a communication channel 1010 disposed within the interior volume 1006 of the spreader structure. The communication channel 1010 runs along the spreader structure 208, and then across the lead-in cable 220 to the tow vessel electronics 1005. Likewise, tow harness 216J has a communication channel 1012 disposed within the interior volume 1006 of the spreader structure. The communication channel 1012 runs along the spreader structure 208, and then across the lead-in cable 220 to the tow vessel electronics 1005. Finally, tow harness 216T has a communication channel 1014 disposed within the interior volume 1006 of the spreader structure. The communication channel 1014 runs along the spreader structure 208, and then across the lead-in cable 220 to the tow vessel electronics 1005. The communication channels may be any suitable communication channel, such as electrical or optical conductors.

The illustrative spreader structure of FIG. 10 is shown as a single unit; however, in cases where the spreader structure 208 is assembled on location from individual spreader sections, each communication channel may have a coupling proximate to the location where two spreader sections are coupled. Moreover, FIG. 10 shows a separate communication channel for each tow harness; however, in some cases the communications that flow across individual communication channels may be electronically combined and sent across the lead-in cable 220 to the tow vessel electronics 1005 on a larger bandwidth communication channel. For example, the communication channels associated with the tow harnesses may be electrical conductors, and one or more devices within spreader structure 208 may combine the communicative messages, and send the messages across an optical connection between the spreader structure 208 and the tow vessel electronics 204.

The spreader structure 208 may be constructed of any suitable material, or combination of materials. In at least one embodiment, the spreader structure 208 may be constructed of a resilient exterior material (e.g., plastic, fiber glass, composite material, carbon fiber, metallic materials) and define one or more hollow interior spaces. In some cases, the spreader structure 208 may be filled with closed cell buoyancy foam to provide buoyancy, yet also reduce water intrusion in the event of a breach. Spreader structures having wider horizontal widths may also comprise internally disposed structural members to provide structural support. In cases where the horizontal width is, or is close to, two kilometers and the trailing edge is non-swept, the chord length at the center of the spreader structure 208 may be on the order of 400 meters. In embodiments where the spreader structure 208 is assembled on-site from a plurality of spreader sections, the spreader sections themselves need not span the entire chord length, and may be assembled from multiple sub-sections to form the spreader section, which is then coupled to adjacent spreader sections.

Figure 11:
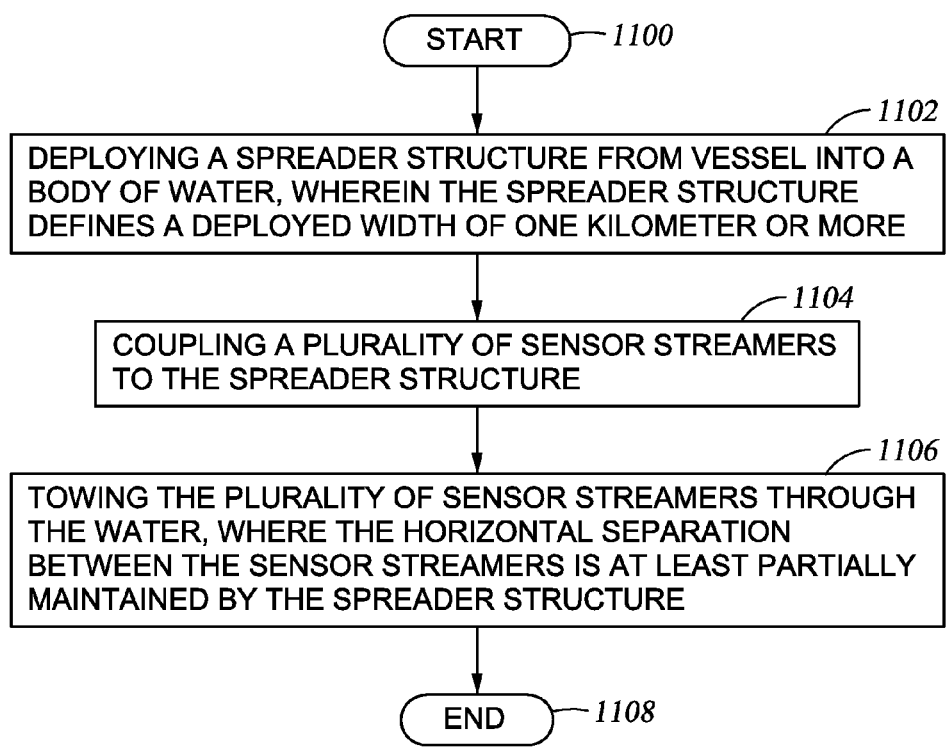
FIG. 11 shows a method in accordance with at least some embodiments.

FIG. 11 shows a method in accordance with at least some embodiments. In particular, the method starts (block 1100) and comprises: deploying a spreader structure from vessel into a body of water, wherein the spreader structure defines a deployed width of one kilometer or more (block 1102); coupling a plurality of sensor streamers to the spreader structure (block 1104); and towing the plurality of sensor streamers through the water, where the horizontal separation between the sensor streamers is at least partially maintained by the spreader structure (block 1106). Thereafter, the method ends (block 1108), possibly to be repeated.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, while only two tow lines are shown, additional town lines may be used. It is intended that the following claims be interpreted to embrace all such variations and modifications.

What is claimed is:

1. A method comprising:
deploying a spreader structure from a vessel into a body of water, wherein the spreader structure defines a deployed width of one kilometer or more;
coupling a plurality of sensor streamers to the spreader structure; and
towing the plurality of sensor streamers through the water, where the horizontal separation between the sensor streamers is at least partially maintained by the spreader structure.

2. The method of claim 1 wherein towing the plurality of sensor streamers further comprises:
towing the spreader structure by way of a tow vessel, wherein a chord of the spreader structure is parallel to a direction of travel of the tow vessel; and
controlling depth of the spreader structure as the spreader structure is towed through the water, the depth controlled at least in part by deflection of a control surface of the spreader structure.

3. The method of claim 2 wherein controlling depth of the spreader structure further comprises changing buoyancy of the spreader structure.

4. The method of claim 1 wherein towing the plurality of sensor streamers further comprises:
towing the spreader structure by way of a tow vessel, wherein a chord of the spreader structure is parallel to a direction of travel of the tow vessel; and
controlling depth of the spreader structure as the spreader structure is towed through the water, the depth controlled at least part by changing buoyancy of the spreader structure.

5. The method of claim 1 wherein deploying the spreader structure further comprises deploying the spreader structure as a single unit.

6. The method of claim 1 wherein deploying the spreader structure further comprises:
coupling a first spreader section to a second spreader section;
placing at least a portion of the first spreader section into water; and then
coupling a third spreader section to the second spreader section.

7. The method of claim 1 further comprising:
maintaining depth of the spreader structure by:
deflecting a first control surface associated with a first portion of the spreader structure, the deflecting the first control surface resulting in a first force tending to move the first portion toward a surface of the water; and simultaneously
deflecting a second control surface associated with a second portion of the spreader structure, the deflecting the first control surface resulting in a second force tending to move the second portion away from the surface of the water.

8. A system comprising:
a tow vessel;
a spreader structure coupled to the tow vessel by at least one tow line, at least a portion of the spreader structure defining a cross-sectional shape of an air foil;
a plurality of harnesses coupled to the spreader structure at spaced apart locations, each harness extending from the spreader structure in a direction opposite the tow vessel;
a plurality of buoys, each buoy comprising a winch, the plurality of buoys coupled one each at a distal end of each harness by way of a respective winch; and
a plurality of sensor streamers, the plurality of sensor streamers coupled one each at the distal end of each harness.

9. The system of claim 8 wherein the air foil cross-sectional shape is at least one selected from the group consisting of: symmetric air foil; non-symmetric air foil, with the long surface facing a surface of the water; and non-symmetric air foil, with the long surface facing a bottom of the water.

10. The system of claim 8 wherein the spreader structure defines an outline of a swept wing.

11. The system of claim 8 wherein the spreader structure defining a towed width of at least one kilometer.

12. The system of claim 8 wherein the plurality of harnesses comprises at least ten harnesses spaced along the spreader structure at constant intervals.

13. The system of claim 12 wherein the constant intervals are each 100 meters.

14. The system of claim 8 wherein the plurality of harnesses comprises twenty harnesses spaced along the spreader structure at constant intervals.

15. The system of claim 14 wherein the constant intervals are each 100 meters.

16. The system of claim 8 wherein the spreader structure further comprises:
a first spreader section with a first system that provides depth control;
a second spreader section with a second system that provides depth control, and wherein the depth changes implemented by the second spreader section are opposite depth changes implemented by the first spreader section.

17. The system of claim 8 wherein the spreader structure further comprises:
a first control surface disposed at a first horizontal location on the spreader structure, configured to cause forces tending to change depth of the spreader structure; and
a second control surface disposed a second horizontal location on the spreader structure, configured to cause forces tending to change depth of the spreader structure, the second control surface distinct from first control surface, and the second horizontal location distinct from the first horizontal location;
wherein the first and second control surfaces are configured to deflect in the same direction in a first mode of operation, and to deflect in opposite directions in a second mode of operation.

18. The system of claim 8 wherein the spreader structure further comprises:
a first buoyancy control portion disposed at a first horizontal location of the spreader structure, the first buoyancy control portion configured to selectively change buoyancy of the spreader structure proximate the first buoyancy control portion; and
a second buoyancy control portion disposed at a second horizontal location of the spreader structure, the second buoyancy control portion distinct from first buoyancy control portion, and the second horizontal location distinct from the first horizontal location;
wherein the first and second buoyancy control portions are configured to change buoyancy in the same direction in a first mode of operation, and to change buoyancy in opposite directions in a second mode of operation.

19. The system of claim 8 further comprising:
a plurality of communication channels disposed within the spreader structure, the plurality of communication channels associated one each with the plurality of harnesses; and
a single lead-in cable coupled between the tow vessel and the spreader structure, the plurality of communication channels communicatively coupled to the single lead-in cable.

20. The system of claim 19 wherein the single lead-in cable does not contribute to a towing force of the spreader structure.

21. The system of claim 8 further comprising:
a first rope coupled between the tow vessel and the spreader structure; and
a second rope, distinct from the first rope, coupled between the tow vessel and the spreader structure;
wherein more than half the towing of the spreader structure is supplied by the first rope and second ropes.

22. The system of claim 8 wherein the spreader structure further comprises:
- a first spreader section, at least one of the plurality of harnesses coupled to the first spreader section;
- a second spreader section distinct from the first spreader section, the second spreader section coupled to the first spreader section, and at least one of the plurality of harnesses coupled to the second spreader section; and
- a third spreader section distinct from the first and second spreader sections, the third spreader section coupled to the second spreader section, and at least one of the plurality of harnesses coupled to the third spreader section.

23. A system comprising:
a spreader structure comprising:
- a first spreader section with a first depth control apparatus;
- a second spreader section with a second depth control apparatus, the second spreader section distinct from the first spreader section, and the second depth control apparatus distinct from the first depth control apparatus;
- wherein the first depth control apparatus is configured to implement depth changes in a first direction, and the second depth control apparatus is configured to implement depth changes in a second direction opposite the first direction during periods of time when first depth control apparatus implements changes in the first direction;
- a first tow point defined on the spreader structure; and
- a second tow point defined on the spreader structure, the second tow point distinct from the first tow point.

24. The system of claim 23:
wherein the first depth control apparatus comprises a first deflectable control surface, and wherein water flow interacting with the first deflectable control surface causes forces tending to change depth of the spreader structure; and
wherein the second depth control apparatus comprises a second deflectable control surface, and wherein water flow interacting with the second deflectable control surface causes forces tending to change depth of the spreader structure, the second deflectable control surface distinct from first deflectable control surface; and
wherein the first deflectable control surface is configured to implement depth changes in a first direction, and the second deflectable control surface is configured to implement depth changes in a second direction, opposite the first direction, during periods of time when first deflectable control surface implements changes in the first direction.

25. The system of claim 23 wherein the spreader structure further comprises:
- a first buoyancy control portion disposed at a first horizontal location of the spreader structure, the first buoyancy control portion configured to selectively change buoyancy of the spreader structure proximate the first buoyancy control portion; and
- a second buoyancy control portion disposed at a second horizontal location of the spreader structure control surface, the second buoyancy control portion distinct from first buoyancy control portion, and the second horizontal location distinct from the first horizontal location;
- wherein in a first mode of operational the first buoyancy control portion and second the second buoyancy control portion are configured to change buoyancy in the same direction, and in a second mode of operational the first buoyancy control portion and second the second buoyancy control portion are configured to change buoyancy in opposite directions.

26. The system of claim 23 further comprising:
- a plurality of communication channels disposed within the spreader structure, the plurality of communication channels associated one each with the plurality of harnesses; and
- a single lead-in cable coupled between the tow vessel and the spreader structure, the plurality of communication channels communicatively coupled to the single lead-in cable.

27. The system of claim 26 wherein the single lead-in cable does not contribute to a towing force of the spreader structure.

28. The system of claim 23 further comprising:
- a first rope coupled between the tow vessel and the spreader structure; and
- a second rope, distinct from the first rope, coupled between the tow vessel and the spreader structure;
- wherein more than half the towing of the spreader structure is supplied by the first rope and second rope.

29. The system of claim 23 wherein the spreader structure further comprises:
- a first spreader section, at least one of the plurality of harnesses coupled to the first spreader section;
- a second spreader section distinct from the first spreader section, the second spreader section coupled to the first spreader section, and at least one of the plurality of harnesses coupled to the second spreader section; and
- a third spreader section distinct from the first and second spreader sections, the third spreader section coupled to the second spreader section, and at least one of the plurality of harnesses coupled to the third spreader section.

30. The system of claim 23 wherein the spreader structure defines an outline of a swept wing.

31. The system of claim 23 wherein the spreader structure defines a cross-section of a symmetric air foil.

* * * * *